United States Patent Office 3,431,072
Patented Mar. 4, 1969

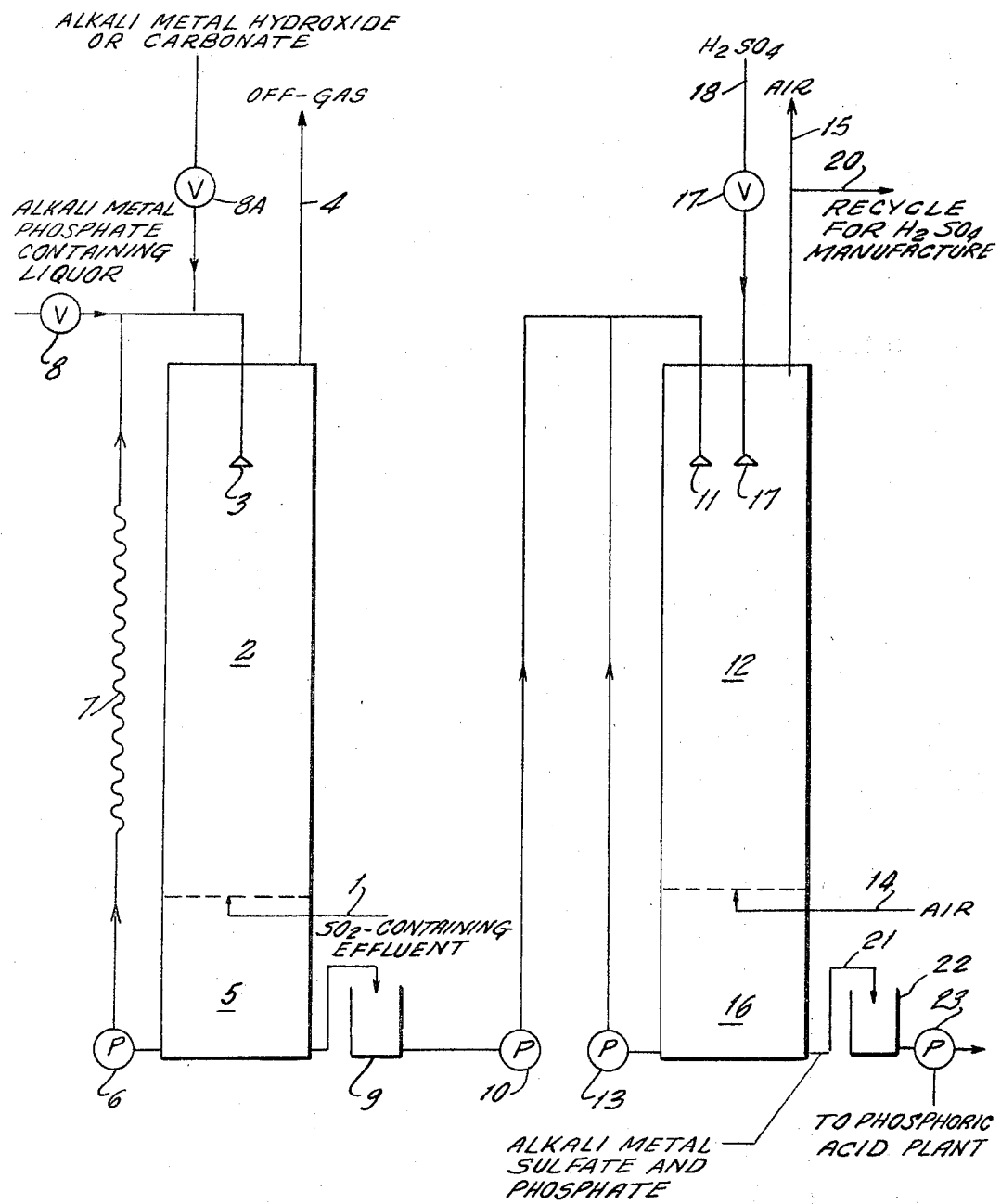

3,431,072
PROCESS FOR RECOVERY AND USE
OF SULFUR DIOXIDE
Maurice Rozie, Ville D'Avray, and Pierre Desire, Saint-Clair-du-Rhone, France, assignors to Societe Progil, Paris, France
Filed Mar. 27, 1967, Ser. No. 626,200
U.S. Cl. 23—165                                 8 Claims
Int. Cl. C01b 17/60, 25/18, 17/56

ABSTRACT OF THE DISCLOSURE

A process for utilizing sulfur dioxide contained within the effluents from the manufacture of sulfuric acid employing the contact process, which involves reacting such effluent mixture with the residual liquors obtained in the manufacture of alkali metal phosphates by the neutralization of phosphoric acid with alkali metal hydroxides and carbonates, converting the resulting mixture containing corresponding alkali metal sulfites and/or bisulfites with oxygen or sulfuric acid, and employing the resulting neutral sulfate-containing mixture as a reactant in the wet process for producing phosphoric acid.

---

The present invention relates to the recovery of sulfur dioxide from gaseous mixtures, and more particularly to the recovery and use of such material contained in the effluent stream produced in the manufacture of sulfuric acid by the contact process, in connection with the production of phosphoric acid by the wet process.

In the following specification, all parts and percentages are given by weight, unless otherwise indicated.

It is well known to produce sulfuric acid by burning sulfur and subsequently catalytically converting the resulting sulfur dioxide to sulfur trioxide in accordance with the so-called "contact process." It is additionally well known to produce phosphoric acid by the reaction of phosphate ores with sulfuric acid in accordance with the so-called "wet process." Such processes are disclosed, for example, in chapters 7 and 10 of the volume entitled "Inorganic Process Industries," by Kenneth A. Kobe (The MacMillan Company, 1948). The operational details of these well known processes viz., the contact process for the manufacture of sulfuric acid and the wet process for the manufacture of phosphoric acid, employed in connection with the present invention, have not been set forth in detail in this specification. Rather, it is intended that the present invention may be carried out in conjunction with the practice of the contact process and the wet process in the manner well known to those skilled in these respective arts.

It is known that about 2% of the sulfur dioxide reacted in the contact process is not transformed into sulfuric acid but is rather entrained with the gaseous effluents from the reaction, thus providing a danger of atmospheric pollution. Numerous procedures have previously been devised for recovering such sulfur dioxide, particularly by absorption in solutions of various alkali metal compounds. Nevertheless, the problem of fully recovering such sulfur dioxide and avoiding consequent atmospheric pollution is one which is frequently difficult to resolve.

It is among the objects of the present invention to provide a process for recovering and using sulfur dioxide contained in minor amounts in gaseous streams, and particularly for recovering and utilizing the sulfur dioxide in such gaseous effluents from the contact process.

Other objects and advantages of the present invention will be apparent from consideration of the following detailed disclosure of preferred embodiments thereof.

In accordance with the present invention, a process has been devised for utilizing the gaseous effluents from the contact process in connection with the manufacture of phosphoric acid by the wet process. Basically, such process involves reacting the sulfur dioxide-containing effluent stream with the effluent mixture resulting from the manufacture of alkali metal phosphates by the reaction of phosphoric acid with alkali metal hydroxides and carbonates, converting the resulting reaction mixture with oxygen or sulfuric acid, and thereafter reacting the neutral sulfate-containing mixture thus produced in the wet process to produce phosphoric acid therefrom. Such process provides the singular advantage of reutilizing in a single operating cycle two distinct effluents in a single plant unit for the production of sulfuric acid, alkali metal phosphates, and phosphoric acid.

In accordance with a preferred form of the invention, a sulfur dioxide-containing gaseous stream, e.g., the effluent mixture from the contact process is reacted with an alkali metal phosphate-containing stream, e.g., the effluent from the manufacture of an alkali metal phosphate by the neutralization of phosphoric acid with alkali metal hydroxides and/or carbonates, containing di- and/or tri-alkali metal phosphates. The alkali metal phosphate-containing reactant suitably comprises, as noted, the effluent from the known reaction for the manufacture of alkali metal phosphates by the neutralization of phosphoric acid with alkali metal hydroxides and/or carbonates. In such reaction the corresponding alkali metal phosphate is crystallized from the reaction mass, the residual mother liquor providing the alkali metal phosphate-containing solution utilized as a reactant in accordance with the present process. Such alkali metal phosphate-containing reactant solution may additionally contain, if desired, the liquors resulting from the washing of impurities removed by filtration from the crude product formed in the neutralization reaction. In view of the wide variation in impurities contained in such liquor, it will be understood that the specfic ratios of di- and tri- alkali metal phosphates incorporated in the phosphate reactant will not be constant.

Depending upon the nature and concentration of the specific salts in the aqueous phosphate-containing solution and the concentration of sulfur dioxide in the gaseous reactant, various different reactions may take place in the initial absorption step of the present process. It is thus possible that one or more of the following reactions are concurrently carried out in the reaction mixture. In the following reactions the letter M designates the alkali metal ion reacted, e.g., sodium, potassium or ammonium·

(1) $2HM_2PO_4 + SO_2 + H_2O \rightarrow 2H_2MPO_4 + M_2SO_3$
(2) $M_3PO_4 + SO_2 + H_2O \rightarrow H_2MPO_4 + M_2SO_3$
(3) $HM_2PO_4 + SO_2 + H_2O \rightarrow H_2MPO_4 + HMSO_3$
(4) $M_3PO_4 + 2SO_2 + 2H_2O \rightarrow H_2MPO_4 + 2HMSO_3$
(5) $M_3PO_4 + \frac{1}{2}SO_2 + \frac{1}{2}H_2O \rightarrow HM_2PO_4 + \frac{1}{2}M_2SO_3$ When the quantity of alkali metal salt in the reaction mixture is insufficient to convert the sulfur dioxide absorbed into the corresponding bisulfite, viz., less than about 2 alkali metal ions per mole of sulfur dioxide, a suitable amount of the corresponding alkali metal carbonate and/or hydroxide may be added to the phosphate-containing liquors. The following additional reactions are obtained upon the addition of such quantities of alkali metal carbonates or hydroxides to the phosphate-containing liquor:

(6) $MOH + SO_2 \rightarrow HMSO_3$
(7) $M_2CO_3 + 2SO_2 + H_2O \rightarrow 2HMSO_3 + CO_2$ The aqueous reaction mixture thus obtained in the first step of the present process incorporates mono- and/or di-alkali metal phosphates, and varying proportions of alkali metal sulfites and/or bisulfites.

As noted hereinabove, the reaction mixture produced in the initial absorption step is subsequently oxidized to convert the alkali metal sulfite or bisulfite constituent thereof to the corresponding neutral sulfate. When such reaction mixture contains a predominant proportion of an alkali metal sulfite, it is preferred to effect the oxidation with oxygen, e.g., by treatment of the reaction mixture with air, in accordance with the following reaction:

(8) $\quad M_2SO_3 + \frac{1}{2}O_2 \rightarrow M_2SO_4$

Such treatment may be readily carried out at ambient temperatures and atmospheric pressures.

When, on the other hand, the absorption reaction mixture contains a predominant proportion of an alkali metal bisulfite, it is preferred to carry out the conversion by treating the mixture with sulfuric acid, in accordance with the reaction:

(9) $\quad 2HMSO_3 + H_2SO_4 \rightarrow M_2SO_4 + 2SO_2 + 2H_2O$

While any concentration sulfuric acid may thus be utilized, it is advantageous to employ a concentrated acid, e.g., having a concentration of from 90 to 98 percent.

It will be noted that, whether oxygen or sulfuric acid is employed to convert the sulfur-containing compounds in the reaction mixture to the corresponding neutral sulfates, it is desirable to employ at least the stoichiometric quantities of such converting agents. It is, however, preferred to employ such reactants in proportions of from about 0.6 to 2 moles of oxygen per mole of alkali metal sulfite in the reaction mixture, and from about 0.6 to 2 moles of sulfuric acid per mole of alkali metal bisulfite in the reaction mixture, respectively.

Additionally sulfur dioxide is regenerated in the reaction mixture in accordance with Reaction 9. The sulfur dioxide thus regenerated may be readily removed from the mixture and received by simply passing air therethrough for degasification. By suitably regulating the rate of flow of such air stream, it is possible to obtain a gaseous mixture having a sufficient sulfur dioxide content to facilitate reuse in the manufacture of sulfuric acid.

In cases in which the reaction mixture formed in the absorption step contains predominant proportions of the alkali metal bisulfite, it is not advantageous to carry out the direct oxidation of the mixture with oxygen, whether in pure form or in admixture with air. In such instance, the following reaction would take place:

(10) $\quad 2HMSO_3 + \frac{1}{2}O_2 \rightarrow M_2SO_4 + SO_2 + H_2O$

The thus regenerated sulfur dioxide, in a quantity half that obtained by the treatment with sulfuric acid, would be immediately entrained by the gas, e.g., air, used for the oxidation. Taking into account the quantity of air necessary to carry out Reaction 10. the concentration of the sulfur dioxide thus regenerated in the gaseous mixture would be so small as to prevent recycling of the mixture to a sulfuric acid manufacturing plant.

It will be understood that it is possible, within the scope of the present invention, to select either, or to alternate one or the other of the conversion treatments of the sulfitic or bisulfitic reaction liquors, in accordance with the nature and the quantities of residual materials available for reaction and as a function of the variations of such concentrations in plant operation.

The alkali metal sulfate-containing mixture produced in the oxidation step discussed hereinabove contains the neutral alkali metal sulfate in admixture with a mono-alkali metal phosphate and, in some instances, a di-alkali metal phosphate. The solution thus obtained may be directly introduced into a plant for manufacturing phosphoric acid employing the wet process.

The use of such a mixture as a reactant in the wet process is particularly advantageous in that it facilitates the simultaneous supply of sulfate and alkali metal ions to the basic reaction carried out in the wet process, viz., the action of sulfuric acid on natural phosphate. The sulfate ions assist in reacting on the phosphate-containing ore, thus reducing the consumption of sulfuric acid. The alkali metal ions contribute to the formation of a pure phosphoric acid, as described, for example, in French Patent No. 1,294,872, by fixing the fluosilicic acid impurity in the phosphoric acid in the form of an alkali metal fluosilicate which is sparingly soluble in phosphoric acid. Moreover, the phosphate ions contained in such mixture are additionally recovered in the phosphoric acid manufacturing process.

It is thus possible, employing the process of the present invention, to compensate for imperfect yields in the production of sulfuric acid and alkali metal phosphates, employing the techniques referred to above, by the recovery, in the phosphoric acid manufacturing process, of those compounds which could not be transformed or isolated in the prior operations. Thus, the approximate 2% of the sulfur dioxide not transformed to sulfuric acid in the contact process may be fully recovered and used in the form of sulfate ions for manufacture of phosphoric acid employing the wet process.

While, as noted, it is peculiarly advantageous to utilize the effluent from the manufacture of alkali metal phosphates as an absorbing solution in the practice of the process hereof, it will be understood that the use of any alkali metal phosphate-containing solution for absorbing sulfur dioxide from gaseous mixtures incorporating the same is comprehended within the scope of the present invention.

The invention is more fully illustrated in the accompanying drawing, illustrating diagrammatically in flow sheet form a preferred embodiment thereof.

In the embodiment shown, gaseous effluents containing sulfur dioxide are fed through conduit 1 into the base of a scrubbing tower 2. They are fed through the tower, counter-current to an alkali metal phosphate-containing solution sparged into the upper end of the tower at 3. The off-gas is thereafter removed through line 4, depleted of its $SO_2$ content.

The reaction mixture containing the absorbed $SO_2$ flows to the base 5 of the scrubber, from which a portion is recycled by pump 6 through condenser 7 to the upper end of the tower. The heat provided by the gaseous effluents and by the heat of formation of sulfite and bisulfite salts is eliminated by means of the condenser 7. The rate of flow of the recycle solution is suitably regulated so that the temperature of the solution flowing through the tower is preferably maintained at below about 40° C.

The pH of the solution at the base 5 of the scrubber 2 is measured and employed for regulating the admission of additional phosphate-containing liquor through valve 8 and alkali metal hydroxide or carbonate-containing additive through valve 8A.

Depending on the quantity and the alkalinity of the phosphate-containing liquors which are available and in relation to the quantity of $SO_2$, several possibilities may be provided for regulating the pH value. When the alkalinity corresponds approximately to the formation of sulfite, the reactions referred to above under (1) and (2) are carried out by fixing the pH at a value which is between 7 and 7.2.

If the alkalinity, because of a decrease in the concentration of $SO_2$ in the gaseous effluents, is higher than that required for the formation of sulfite, which is observed by an increase in volume of phosphate-containing liquors in storage, the Reaction 5 is carried out in part or completely, by momentarily isolating the control circuit of the valve 8, so that the latter is opened to its maximum.

When the supply of phosphate-containing liquors has returned to its normal volume, the control circuit of the valve 8 is again brought into use.

When an alkalinity corresponding approximately to the formation of bisulfite is available, in relation to $SO_2$, the Reactions 3 and 4 are carried out by fixing the pH at a value which is between 4.6 and 4.8. If the alkalinity, due to an increase in the concentration of $SO_2$ in the gaseous effluents, is smaller than that for the formation of bisulfite, which is observed by a reduction in the volume of the stored phosphate-containing liquors, the Reactions 6 or 7 are carried out in part or completely. For this purpose, the control circuit of the valve 8 is momentarily isolated, so that the latter is closed or open to a minimum extent and the control circuit on the valve 8A for admission of alkali carbonate or hydroxide is brought into operation, so that the pH of the solution at the bottom of the tower is kept at a value equal to or slightly greater than 4.6. When the stock of phosphate-containing liquors has returned to its normal volume, the control circuit of the valve 8 is again brought into operation.

The liquors containing the alkali metal sulfite and/or bisulfite, collected in tank 9, are pumped at 10 and sprayed at 11 into the top of a second tower 12 similar to the scrubber 2. The solution fed through such tower is recycled by means of pump 13 to insure the homogeneity of the mixture fed therethrough.

If the solution sprayed into the tower at 11 contains a predominant proportion of alkali metal sulfite, a current of air sufficient to oxidize all the sulfite is introduced at the base of the tower through conduit 14. The air is discharged into the atmosphere through exit line 15 at the upper end of the tower.

If the sprayed solution contains a predominant proportion of bisulfite, the pH of the solution collected at 16 at the base of the tower is adjusted to a value of between 1 and 1.5 by means of a control valve 17 for the admission of concentrated sulfuric acid fed through line 18 and sprayed at 19 into the upper end of the tower. In this case, the flow rate of the air admitted through line 14 is reduced in order to obtain, after degasifying the solution containing the bisulfite, a gaseous mixture titrating 6 to 8 percent by volume of $SO_2$. Such gaseous mixture is thereafter recycled through line 20 for use in the contact process for sulfuric acid manufacture.

Finally, the solution of neutral sulfate and monoalkali phosphate, which may additionally contain some dialkali phosphate or sulfuric acid, is discharged by way of overflow through line 21 into tank 22, and fed by pump 23 to the phosphoric acid plant for use in the wet process.

The following examples are given as illustrative and non-limiting of the process of the present invention:

EXAMPLE I

For reaction with 2 cubic meters of wash waters and mother liquors originating from the manufacture of sodium phosphates and containing 41.3 g./l. of $Na_2HPO_4$ and 90 g./l. of $Na_3PO_4$, there were available 25,000 cubic meters of gaseous effluents containing 0.2% by volmue of $SO_2$. The phosphate-containing solution provided a quantity of alkali metal compounds corresponding to 86 kg. of $Na_2O$ capable of reacting, and the gaseous effluents provided 143 kg. of $SO_2$. In order to fix 143 kg. of $SO_2$ in the form of sulfite, 138 kg. of $Na_2O$ are required; in order to fix the same quantity in the form of bisulfite, 69 kg. of $Na_2O$ are necessary. Thus, only 1.6 cubic meters of solution containing 69 kg. of $Na_2O$ were employed and 0.4 cubic meter of solution was provisionally stored.

The 1.6 cubic meters of solution were sprayed into the upper end of the first absorption tower and flowed countercurrent to the 25,000 cubic meters of gaseous effluents. About 1.6 cubic meter of solution, containing 161 kg. of monosodium phosphate, 182 kg. of sodium bisulfite and 62 kg. of sodium sulfate, were collected in the intermediate tank.

The gases discharged at the top end of the tower contained 0.004% by volume of $SO_2$.

The solution was then sprayed at the top end of the second tower at the same time that 140 kg. of 92% sulfuric acid was fed thereto. The solution was fed through the second tower countercurrent to 500 cubic meters of air blown in at the base of the tower. About 1.6 cubic meters of solution containing 161 kg. of monosodium phosphate, 0.3 kg. of sodium bisulfite, 186 kg. of sodium sulfate and 43 kg. of sulfuric acid were thus collected in the intermediate tank.

Such solution was sent to the phosphoric acid manufacturing plant for reaction with sulfuric acid and phosphate ore.

At the top end of the second tower, 540 cubic meters of a gaseous mixture titrating 7.25% by volume of $SO_2$ were collected, and such was sent to the sulfuric acid manufacturing plant for use in the contact process.

EXAMPLE II

When the operations described in Example I were repeated three times, there was available a stock of 3.2 cubic meters of solution for 25,000 cubic meters of gaseous effluents. It was then possible to carry out the fixation of $SO_2$ in sulfite form in the first tower.

The composition of the gaseous effluents, discharged at the top end of this tower, was the same as in Example I, but approximately 3.2 cubic meters of solution, containing 322 kg. of monosodium phosphate, 220 kg. of sodium sulfite and 62 kg. of sodium sulfate, were collected at the base of the tower. This solution was then sprayed at the top of the second tower and fed countercurrent to 2,000 cubic meters of air blown in at the base of the tower. The air was discharged into the atmosphere at the top of the tower, while about 3.2 cubic meters of solution containing 322 kg. of monosodium phosphate, 0.35 kg. of sodium sulfite and 310 kg. of sodium sulfate were collected in the intermediate tank. This solution was removed, as in the first example, for the manufacture of phosphoric acid.

It will thus be seen that, in accordance with the present invention, a process has been provided for the efficient recovery and use of sulfur dioxide contained within the gaseous effluent resulting from the manufacture of sulfuric acid. As noted hereinabove, various changes may be made in the specific embodiments of the process described without departing from the scope of the present invention. Accordingly, the preceding description should be construed as illustrative and not in a limiting sense.

What we claim is:

1. A process for the recovery and use of sulfur dioxide present in a mixture with one or more other gases, which comprises:
    (a) contacting said mixture with an aqueous solution containing at least one alkali metal phosphate to absorb the sulfur dioxide from the mixture and thereby form a material selected from the group consisting of the corresponding alkali metal sulfite and bisulfite in said solution;
    (b) reacting the resulting mixture with an agent selected from the group consisting of oxygen and sulfuric acid to produce a mixture containing the corresponding alkali metal sulfate; and
    (c) reacting the sulfate-containing mixture with a mineral phosphate and sulfuric acid to produce phosphoric acid therefrom.

2. The process of claim 1, wherein the aqueous alkali metal phosphate-containing solution reacted in step (a) is produced by reacting phosphoric acid with a reactant selected from the group consisting of the corresponding alkali metal hydroxide and carbonate, crystallizing the corresponding alkali metal phosphate from the resulting reaction mass, and recovering the residual mother liquor to provide said alkali metal phosphate-containing solution.

3. The process of claim 1, wherein there is added to the aqueous alkali metal phosphate-containing solution, a material selected from the group of alkali metal hydroxide and alkali metal carbonate.

4. The process of claim 1, in which the reaction mixture formed in step (a) contains a major proportion of alkali metal sulfite and wherein said reaction mixture is reacted in step (b) with oxygen.

5. The process of claim 4, wherein said reaction mixture is reacted with oxygen in step (b) in the proportion of from 0.6 to 2 moles of oxygen per mole of said alkali metal sulfite contained therein.

6. The process of claim 1, in which the reaction mixture formed in step (a) contains a major proportion of alkali metal bisulfite, and wherein said reaction mixture is reacted in step (b) with sulfuric acid.

7. The process of claim 6, wherein said reaction mixture is reacted with sulfuric acid in step (b) in the proportion of from 0.6 to 2 moles of sulfuric acid per mole of said alkali metal bisulfite.

8. The process of claim 1, in which the mixture produced in step (b) contains sulfur dioxide, and wherein the sulfur dioxide thus regenerated is removed from said mixture prior to step (c) by passing air through the mixture to degasify the same.

References Cited

UNITED STATES PATENTS

| Re. 19,045 | 11/1934 | Larsson | 23—165 |
| 1,765,560 | 6/1930 | Barbou | 23—129 |
| 3,391,996 | 7/1968 | Van Dijk et al. | 23—165 |

FOREIGN PATENTS 1,427   1883   Great Britain.

EARL C. THOMAS, *Primary Examiner.*

ARTHUR GREIF, *Assistant Examiner.*

U.S. Cl. X.R.

23—2, 129, 178